US012764198B2

(12) United States Patent
Jurkus et al.

(10) Patent No.: US 12,764,198 B2
(45) Date of Patent: Oct. 13, 2026

(54) MULTI-HOP SOCKS5 PROXY

(71) Applicant: OXYLABS, UAB, Vilnius (LT)

(72) Inventors: Tomas Jurkus, Kaunas (LT); Giedrius Stalioraitis, Vilnius (LT)

(73) Assignee: OXYLABS, UAB, Vilnius (LT)

( * ) Notice: Subject to any disclaimer, the term of this patent is extended or adjusted under 35 U.S.C. 154(b) by 0 days.

(21) Appl. No.: 18/679,709

(22) Filed: May 31, 2024

(65) Prior Publication Data

US 2025/0260670 A1 Aug. 14, 2025

Related U.S. Application Data

(60) Provisional application No. 63/551,920, filed on Feb. 9, 2024.

(51) Int. Cl.

| | |
|---|---|
| ***H04L 67/561*** | (2022.01) |
| ***H04L 9/40*** | (2022.01) |
| ***H04L 61/2517*** | (2022.01) |
| ***H04L 61/59*** | (2022.01) |
| ***H04L 67/02*** | (2022.01) |
| ***H04L 69/165*** | (2022.01) |

(52) U.S. Cl.

CPC ........ *H04L 67/561* (2022.05); *H04L 61/2517* (2013.01); *H04L 61/59* (2022.05); *H04L 63/0281* (2013.01); *H04L 67/02* (2013.01); *H04L 69/165* (2013.01)

(58) Field of Classification Search

None

See application file for complete search history.

(56) References Cited

U.S. PATENT DOCUMENTS

| | | | |
|---|---|---|---|
| 7,287,077 B2 | 10/2007 | Haugh et al. |
| 8,125,907 B2 | 2/2012 | Averi et al. |
| 8,214,899 B2 | 7/2012 | Chien |
| 9,444,903 B2 | 9/2016 | Nuaimi et al. |

(Continued)

OTHER PUBLICATIONS

International Search Report and Written Opinion directed to related International Application No. PCT/IB2025/051163, mailed Apr. 4, 2025; 18 pages.

(Continued)

*Primary Examiner* — Lashonda Jacobs-Burton

(74) *Attorney, Agent, or Firm* — Sterne, Kessler, Goldstein & Fox P.L.L.C.

(57) ABSTRACT

The present invention discloses a method and system of an internet proxy service, configuring the service in an ingress proxy—a virtual single access point receiving requests from a user's device. Users' requests to connect to a target web service on the internet may be directed through a plurality of different proxy service nodes being managed by the ingress proxy node with specific efficient functionalities. The ingress node routes the requests to the target web service through one of the remote proxies (outbound nodes), according to metadata in the user's request. The invention enables more easily/efficiently to select outbound nodes randomly or stick to a selected outbound node. These special functionalities are useful when scraping web data, e.g., it appears technically efficient to use TCP/IP ports. Furthermore, the invention enables one to add other important configurations and functionalities to proxy services using the SOCKS5 protocol.

12 Claims, 6 Drawing Sheets a) state-of-art SOCKS5 communication b) by the invention

(56) References Cited

U.S. PATENT DOCUMENTS

| | | | | |
|---|---|---|---|---|
| 9,973,387 | B1 * | 5/2018 | Li | H04L 69/162 |
| 10,009,230 | B1 * | 6/2018 | Li | H04L 67/1001 |
| 10,965,770 | B1 * | 3/2021 | Vilcinskas | H04L 67/563 |
| 10,979,533 | B2 * | 4/2021 | Shribman | H04L 67/06 |
| 10,985,934 | B2 * | 4/2021 | Shribman | H04L 67/02 |
| 11,140,235 | B1 * | 10/2021 | Vilcinskas | H04L 67/146 |
| 11,418,582 | B1 | 8/2022 | Swain et al. | |
| 11,470,174 | B2 * | 10/2022 | Vilcinskas | H04L 67/56 |
| 11,503,105 | B2 | 11/2022 | Rubenstein et al. | |
| 11,637,812 | B2 | 4/2023 | Lewin et al. | |
| 11,677,856 | B2 | 6/2023 | Shribman et al. | |
| 11,770,457 | B2 * | 9/2023 | Pilkauskas | H04L 67/289 709/227 |
| 11,831,616 | B2 * | 11/2023 | Lewin | H04L 63/102 |
| 12,003,600 | B2 * | 6/2024 | Pilkauskas | H04L 61/4511 |
| 12,355,774 | B1 | 7/2025 | Ji | |
| 12,381,958 | B2 * | 8/2025 | Pilkauskas | H04L 67/289 |
| 2004/0243703 | A1 * | 12/2004 | Demmer | H04L 69/40 709/224 |
| 2005/0114531 | A1 * | 5/2005 | Kadyk | H04L 63/0281 709/229 |
| 2007/0083723 | A1 | 4/2007 | Dey et al. | |
| 2007/0283023 | A1 * | 12/2007 | Ly | H04L 67/56 709/227 |
| 2014/0280896 | A1 | 9/2014 | Papakostas et al. | |
| 2020/0379657 | A1 | 12/2020 | Ridgway et al. | |
| 2021/0144096 | A1 | 5/2021 | Plat et al. | |
| 2021/0288959 | A1 | 9/2021 | Marzorati et al. | |
| 2023/0208839 | A1 | 6/2023 | Kozlovski et al. | |
| 2023/0336542 | A1 * | 10/2023 | Zihnioglu | H04L 63/083 |
| 2024/0045801 | A1 | 2/2024 | Thomas et al. | |
| 2025/0119410 | A1 * | 4/2025 | Slenders | H04L 63/083 |
| 2025/0260749 | A1 | 8/2025 | Jurkus et al. | |

OTHER PUBLICATIONS

Srisuresh, P., et al., "IP Network Address Translator (NAT) Terminology and Considerations," RFC 2663, Aug. 1999, 30 Pages.

* cited by examiner a) state-of-art SOCKS5 communication b) by the invention a)

b)

MULTI-HOP SOCKS5 PROXY

FIELD OF INVENTION

The present invention relates to managed internet proxy services and implementations thereof. Specifically, the invention discloses a method and a system as internet proxy infrastructure, with implementations of configuring the proxy service using a managed Ingress proxy component, being a virtual single access point to receive requests from a user's device for accessing an internet web target through said managed proxy service.

BACKGROUND

Proxy servers generally act as intermediaries for requests from clients seeking content, services, and/or resources from target servers (e.g., web servers) on the internet. For example, a client may connect to a proxy server to request data from another server. The proxy server evaluates the request and forwards the request to the other server containing the requested data. In the forwarded message, the source address may appear to the target to be not the client, but the proxy server. After obtaining the data, the proxy server forwards the data to the client. Depending on the type of request, the proxy server may have full visibility into the actual content fetched by the client, as is the case with an unencrypted Hypertext Transfer Protocol (HTTP) session. In other instances, the proxy server may blindly forward the data without being aware of what is being forwarded, as is the case with an encrypted Hypertext Transfer Protocol Secure (HTTPS) session.

To interact with a proxy service, the client/service user may transmit data to a proxy server where the data is formatted according to a proxy protocol. The HTTP proxy protocol is one example of how the proxy protocol may operate. HTTP operates at the application layer of the OSI model network protocol layers stack (comprising 7 layers). In another example, HTTP tunneling may be used, using, for example, the HTTP CONNECT command. Still, in another example, the proxy may use a SOCKS internet protocol. While the HTTP proxy protocol operates at the application layer (Layer 7) of the OSI (Open Systems Interconnection) model protocol stack, SOCKS may operate at the session layer (Layer 5 of the OSI model protocol stack). Other protocols may be available forwarding data at different layers of the network protocol stack.

Proxy servers, however, do more than simply forward web requests. In some instances, proxy servers can act as a firewall, act as a web filter, provide shared network connections, and cache data to speed up common requests. Proxy servers can also provide privacy and can control internet usage of employees and children. Proxies can also be used to bypass certain internet restrictions (e.g., firewalls) and to circumvent geo-based content restrictions. For example, if a client requests content from a webpage located on a webserver in one country, but the client's home country does not allow access to that content, the client can make the request through a proxy server that contacts and retrieves the content, thereby concealing the location of the target server. Proxy servers can also be used for web scraping, data mining, and other similar tasks. A proxy server changes the request's source IP address, so the web server is not provided with the geographical location of the scraper. Using the proxy server makes a request appear more organic and thus ensures that the results from web scraping represents what would actually be presented if a human would make a request.

SUMMARY

Problem to solve. Modern proxy services meet challenges to improve performance of the proxy service (speed, configurability, security, availability). Further, in a proxy service configuration, various options are required by a broad range of internet applications, such as: web scraping, providing Data center IP proxies, creating different kinds of datasets (e.g., product lists, prices, balances in electronic stores, and the like). Furthermore, different protocols (such as HTTP, HTTPS, SOCKS (v. 4, 5)) are used for providing proxy services. Some protocols, such as SOCKS/SOCKS5, have limited functionality or impede their restrictions to ensure required flexibility for users and providers of proxy services.

New solutions are needed to ensure that users and internet applications using SOCKS protocol could also use Data center IP proxies and proxy services without currently encountered limitations. The present invention overcomes encountered limitations by introducing new functions and components in the proxy service infrastructure and/or enhancing known functions of proxy service infrastructure.

Solution. The disclosed solution introduces an Ingress proxy node to provide specific efficient functionalities in the proxy service infrastructure. These functionalities involve, at least

- Use of TCP/UDP ports to select an outbound proxy node,
- Additional information/metadata appended into user's login "username"-field, for managing the proxy service, and
- An improved SOCKS (SOCKS5) protocol for multi-hop functionality of SOCKS-type proxy services.

Users' requests to connect to a target web service on the internet (target) through a plurality of proxy service proxy nodes are managed by an Ingress proxy having/performing said specific functionalities. The Ingress proxy routes the user's request through one of the remote proxies (outbound nodes, exit nodes) to the target web service, according to a metadata defined in the user's request for the proxy service. This metadata in the user's request, according to the present invention, can be any of the definitions:

- specific TCP/UDP port/port number of the Ingress proxy, related to selecting specific outbound proxy nodes,
- additional service data introduced as a part of user's login "username"-field within the user's request, defining some parameters of the proxy service configuration; for example, country/city code of a proxy exit-node or a group thereof; additional headers, for example, parameter identification prefixes, e.g. "proxy-ip:73.6.111.27", "proxy-country:US", "proxy-proxy-id:7", etc.;
- or combinations of the above metadata.

For example, a Proxy service uses HTTP proxy and VSOCKS servers (components of the service infrastructure) as an Ingress proxy nodes, an Agent (also component of the service infrastructure) operating as information/data provider to the Ingress proxy nodes from internal or external statistics and asset storage subsystems. Meanwhile, HTTP proxy relay and VSOCKS RELAY nodes operate as outbound proxy nodes (remote proxy, exit-nodes) in various geographical locations. Outbound proxies can be either the service Provider's infrastructure components, or they may be provided by a third party. In the current implementation, outbound proxies are Data center proxies.

The Agent fetches users' authentication information, service configurations/limitations for that user, and other settings from the Asset store (for example, implemented as a database and a queue). Then, using this data, the Agent generates a configuration file for HTTP proxy and VSOCKS servers/nodes. The Agent also collects statistical data from the Ingress proxy and sends it to the Statistics store (e.g., comprising a database and a queue).

HTTP and HTTPS-type requests are handled by the HTTP ingress proxy while SOCKS5 requests are handled by VSOCKS ingress proxy. All requests first come to the HTTP proxy node. The HTTP proxy checks if the user's request was sent using the HTTP[S] protocol. If the request was sent using the HTTP[S] protocol, then the HTTP proxy itself performs the routing and selection of an outbound proxy node. If the user's request was not sent using HTTP[S] protocol, then the request is forwarded to the VSOCKS Ingress node (SOCKS-type).

The VSOCKS node handles SOCKS5 protocol requests, including negotiation and authentication of the user. The VSOCKS node sends the user request using a modified SOCKS5 protocol, through an outbound proxy node to the internet web service, and then returns back the information from the web service to the user's device.

In the disclosed proxy service infrastructure, there is at least one Ingress proxy and at least one outbound proxy allocated in a particular geographical region (for example, city or country).

The ingress proxy comprises:

An HTTP/HTTPS proxy node, which is a reverse-proxy that provides a high-availability load-balancer for TCP and HTTP-based applications. It spreads users' requests across multiple physical servers. It is particularly suitable for very high traffic websites and empowers a significant portion of the world-wide-web (www) sites. An example of the HTTP proxy technical implementation is a HAProxy. VSOCKS node which is an application in a server that serves SOCKS5-type users' requests for proxy services. VSOCKS implements a fast and efficient communication mechanism between the User's device and Target web service in the internet.

Agent—the agent interacts with Storage subsystems using complex protocols (such as queue, REST API, and stream). The Agent fetches data, filters and transforms data to a needed form and supplies it to the HTTP proxy and VSOCKS nodes in real time. The Agent can also collect important metrics from HTTP and VSOCKS proxies, and report the collected metrics to Storage subsystems (or through actors thereof), by the same complex protocols (queue, REST API, stream).

Outbound proxies part comprises these options:

HTTP proxy relay SQUID—a caching and forwarding proxy for the Web supporting HTTP, HTTPS, FTP, and more protocols. SQUID has a wide variety of uses, including speeding up a web server by caching repeated requests, caching World-Wide-Web (WWW), Domain Name System (DNS), and other lookups for a group of people sharing network resources, and aiding security by filtering traffic. An example of HTTP proxy relay is Squid application;

"VSOCKS relay" is a special implementation of SOCKS5-type proxy in a relay mode. In the present invention, the proxy-relay-mode comprises at least 2 VSOCKS nodes (servers running VSOCKS application): the VSOCKS Ingress node and a VSOCKS relay. Technically the VSOCKS relay is the same as the VSOCKS Ingress node, except the VSOCKS relay does not perform the first stage of user authorization, which are necessary according to the SOCKS5 protocol, when initially communicating with the user/client. One or more VSOCKS-relays receive requests only from the VSOCKS Ingress proxy. Therefore, authorization in the VSOCKS relay is based only on the IP address of the VSOCKS Ingress proxy. The VSOCKS relay does not know from which user the initial request came, and what is the scope of services the user is granted with. The VSOCKS relay node executes the user's request ("connect" command) to the target web service.

Effects/advantages. The disclosed invention enables the user to select efficiently (faster, more easily) an Outbound proxy exit-node, either randomly or sticking through any proxy exit-node selected by the user himself. This functional capability in wide-area proxy services can be useful when scraping data in the Internet—by the invention, it is technically efficient to do using TCP/UDP (OSI Transport layer 4) ports to select a desired proxy exit-node.

Another embodiment, appending different proxy service parameters in the user's login "username"-field, parametrizes and configures flexibly and scalably SOCKS5-type proxy services, thereby providing advantages in combination with various configurations of wide-area proxy services.

One more embodiment, implementing SOCKS5-type "relay" in combination with the SOCKS5-type Ingress proxy, grows and scales SOCKS5-type proxy services, overcoming technical limitations inherent in the "state-of-art" SOCKS5 protocol.

BRIEF DESCRIPTION OF THE FIGURES

Furthermore, FIG. 2 shows different workflow arrows (dashed-arrows), how proxy service configuration for a particular user is uploaded into the ingress node 104/106/110. Then this configuration is maintained continuously, by the Agent 114, within the ingress node 104/106/110. For example, it can be updated or limited according to the collected usage statistics (exceeding data quota, etc.). The workflow arrows 202 show the service configuration uploading and maintenance workflow. The workflow arrow 204 shows the workflow of proxy service usage data collection into the Statistics Store 120. Workflow arrows 206 and 208 show that proxy service configurations are initiated and maintained into the asset store 118 from the user's service portal and/or from service administration panel 206. Further, workflow arrows 210, 212, 214, and 216 show how the proxy service is initiated and provided to the user, according to the actual proxy service configuration 220 for that user, said configuration running within the ingress proxy 104/106/110. The workflow arrow 210 indicates the user's request for service; then, according to the service configuration 220 data-a suitable outbound node 122 is selected; then, the selected outbound node 122 makes a connection to the target web service 128; and then, the user's device 102 is enabled to communicate with the target web service 128, through the configured proxy service.

a) The "state-of-art" communication through a single SOCKS5 proxy node, between the client and target web service;

b) SOCKS5 communication, according to the present invention, in a proxy service infrastructure, based on SOCKS5-type protocol. The infrastructure comprises: a SOCKS5-type ingress proxy and a SOCKS5-type exit node. The ingress proxy receives request from the user's device and performs authorization of the user for his assigned service; afterwards, the ingress proxy receives SOCKS5 CONNECT command from the user, and transfers it to the SOCKS5 exit node; then the SOCKS5 exit node connects to the target web service, thereby establishing a connection between the user's device and target web service. The established data communication runs through 2 SOCKS5 nodes (correspondingly, 2 hops) of the proxy service infrastructure.

Figure 7:
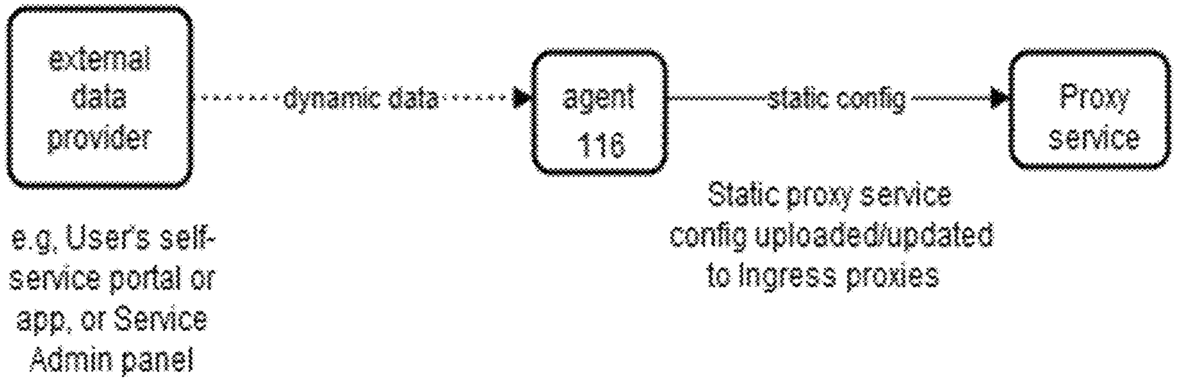
Figure 7:
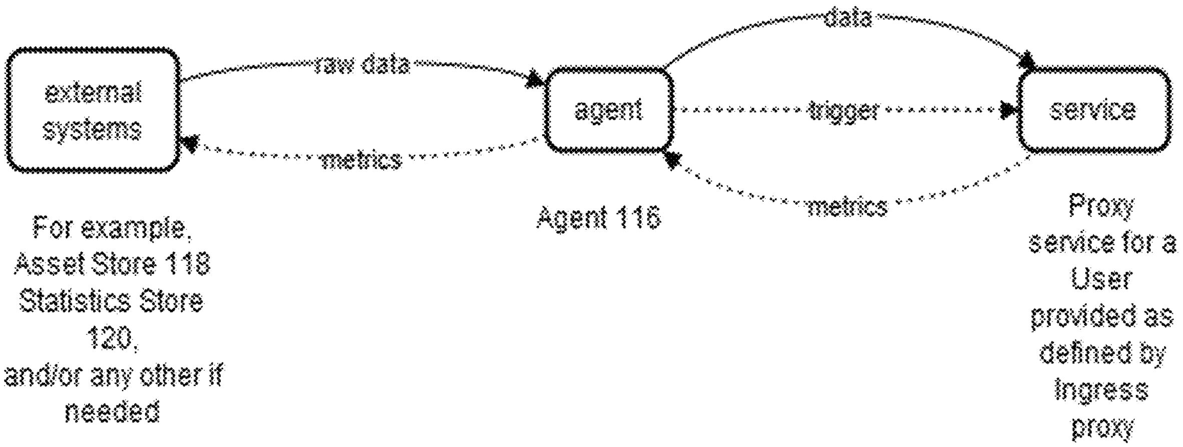

FIG. 7 depicts agent 116 serving ingress proxies and proxy services for users, specifically how it:

a) dynamically generates a static configuration for a service/program. Some services/programs don't provide an API or other means to dynamically update some parts or anything at all in a configuration—these parts of the configuration are static. The disclosed agent 114 has a purpose for a proxy service to dynamically generate a static configuration, and apply that configuration to the proxy service (for example, assigned for a particular user);

b) provides real-time data for a running proxy/service; the agent 114 interacts with other external systems (e.g. asset and statistics stores 118, 120) using complex protocols (queue, REST API, stream, . . . ), fetches data, filters and transforms the selected data into a needed form; then agent 114 feeds the transformed data to proxy servers/service (ingress nodes 106/110) in real time; if needed, the agent 114 may trigger the proxy service/servers 106/110 to consume the fed data; agent 114 can collect important metrics from a proxy/service (ingress nodes 106/110) and report the collected metrics, for example, to store into asset or statistics stores 118, 120.

TERMS AND SYNONYMS USED IN DESCRIPTION AND CLAIMS

User—a person, or legal entity requesting to connect to some target service 128 in Internet;

Target service, or target web service, or target, or web service, or web service on the internet 128—an internet service, which the user wishes to access;

User's device 102—a technical entity, from which user's requests for connecting to the target service 128 to be delivered and connection established: a computer, a server, a tablet, a smartphone or any other type of end-device requiring connection to the target web service 128;

Proxy service, managed proxy service, manageable/configurable proxy service—an intermediary entity, a proxy, through which user's requests and connections from the user's device 102 to the target 128 are established;

Proxy service infrastructure—one or more servers, networks, datacenters, and other physical entities, to be prepared, connected, arranged, configured and operated, with the purpose to provide the proxy service/services to users;

Proxy service provider—a company, a legal entity, a natural person who arranges proxy service infrastructure and on its basis provides proxy services to users;

Ingress, ingress proxy, ingress proxy server, ingress proxy node 104/106/110, ingress proxy gateway—an entity in the proxy service and infrastructure thereof, wherein a user/user's device 102 sends requests for a proxy service to connect via it to the target 128;

Exit nodes, exit proxies, exit proxy nodes, outbound nodes, outbound proxy nodes, outbound proxies, proxy relays, 122/124/126, HTTP/HTTPS relays, SOCKS5 relays, proxy relay nodes—entities allocated in different locations, geographic locations, e.g., remote datacenters, through which proxy services to the user are provided in those different locations, to access targets 128 allocated in those different locations;

Asset store, statistics store—storage entities in which various configurations and statistical data, users' databases are stored, updated, and used by the proxy service, in this invention, specifically, by the ingress proxy nodes 104/106/110.

Agent 114—a virtual entity, e.g., an application, software module, running in the ingress proxy 104/106/110, and responsible for management and exchange of the proxy service configuration data between the asset store, statistics store and ingress proxy nodes 104/106/110.

Proxy service configuration, service configuration, configuration list—various configurations or partial configuration entities of proxy services in the present invention. Said configurations make the proxy service manageable, configurable, and user-definable, and operations of their disclosed methods are driven by those proxy service configurations.

VSOCKS—a name of a proprietary SOCKS5 proxy application or instance. In the present invention, VSOCKS proxy node is considered to be equivalent to SOCKS5 proxy node.

DETAILED DESCRIPTION

Various embodiments of the invention are described below.

1. Selecting an Exit-Proxy by TCP/UDP Port at the Ingress-Proxy

The message with the list of IP addresses arranged in a specific order (and other needed information for service) is sent to the asset store (queue), by a self-service (user's) or by an administration panel (service provider's). Then, agent 114 retrieves and processes this information, and provides it to the HTTP proxy 106. The HTTP proxy 106 uses the list of IP addresses arranged in the same order as it was provided originally, and associates the ingress proxy TCP/UDP ports to IP addresses of exit nodes 122/124/126 starting sequentially from the configured starting TCP/UDP port (in the example 3001, in production 8001). The starting TCP/UDP port and the mapping of TCP/UDP port-to-IP-address logic is defined in the self-service so it could provide detailed information to the user how he should use the proxy services, granted/assigned to him. The particular TCP/UDP port 8000 of the ingress proxy is used when the user wants to send one or more requests through randomly selected exit nodes 122/124/126 with their IP addresses.

Use case example. The client/user has access to 10 outbound proxy nodes 122. In this example, 5 of those 10 outbound nodes 122 are allocated in the USA, and other 5 ones 122 are allocated in Germany. The user creates his credentials (for example, bob1:pwd) within the proxy service provider's website (e.g., within the user's self-service account, or a provider's manager creates the new credentials using the service administration panel). Then, the user gets from the service provider the IP address of the ingress proxy 104. For example, the address of the ingress proxy 104 is: dc.ProxyProvider.io:8000

Using this single ingress proxy IP address, the user can then request for and access all 10 outbound proxies 122, also in different countries. The exemplary code configurations of a request for proxy service may be as follows: curl-U bob1:pwd-x http://dc.ProxyProvider.io:8000 https://ip-.ProxyProvider.io This request/command allows the user's device (e.g., computer) to connect to the ingress proxy 104, which on its part selects an outbound proxy node 122 for this request/connection.

The outbound proxy node 122, assignable to the user, is related (within the internal configuration of the proxy service/infrastructure) by its IP address via a specific TCP/UDP port of the ingress proxy 104. Thereby, requesting the ingress proxy 104 for its specific TCP/IP ports, thereby, allows the user to exit to the target web service 128 through the correspondingly configured outbound proxy nodes 122.

When assigning the outbound proxy node 122—for example, when using in the user's request the TCP/UDP port number 8000—every request will be routed through a randomly selected outbound proxy node 122 from the list of user's outbound nodes 122 (as mentioned, in this example, the list comprises 10 outbound nodes: 5 in the USA and 5 in Germany). This random selection from said list is performed by the ingress proxy 104.

Furthermore, the user can also select manually a specific outbound node 122 and its IP address to use from the whole list assigned to him (for example from 10 outbound nodes). This can be performed by sending a request to the ingress proxy 104 indicating a specific TCP/UDP port, by values thereof ranging between 8001 and 8010. To use the first outbound proxy from the assigned list of all user's proxies, the user should send his request to the ingress proxy 104 and its TCP/UDP port 8001, for example: curl-U bob1:pwd-x http://dc.ProxyProvider.io:8001 https://ip.ProxyProvider.io The range of TCP/UDP port numbers in the current example is 10 IPs—from 8001 to 8010. Certainly, these TCP/UDP port numbers and ranges can vary according to the amount of outbound proxy nodes 102 assigned to and managed by the user.

The user also can filter the assigned outbound nodes 122 by a country or city using a data tag in a username—i.e., field "username" which is a single parameter within a standard/typical user's request line for proxy service: curl-U user-bob1-country-us:pwd-x http://dc.ProxyProvider.io:8000 https://ip.ProxyProvider.io When the country field in the "username" is used, the number of IP addresses that can be used using ports is reduced. In this scenario, 8001 port can receive another IP address if a country code field is used.

In the above scenario, the field "username" itself is also tagged. This example embracing proxy service parameters within the field "username" parameter, is related also to another embodiment of the invention, which is described with more details later in the text.

Examples of requesting proxy service. The ingress proxy 104 listens for incoming connections (user requests) on some range of TCP/UDP ports (generally, OSI transport layer 4 ports). For example, the listed port range is 3001-3100. This means that the ingress proxy 104 has 100 IPs (192.0.0.1-192.0.0.100) where it can resend its received requests from the user. If the user uses port 3001 to access the ingress proxy 104, then all requests to that TCP/UDP port 3001 will be forwarded by the ingress proxy 104 to the first IP address of that range, 192.0.0.1. In the same manner, such a request to the target web service 128 will be resent from that IP address 192.0.0.1. If the TCP/UDP port 3033 is used to access the ingress proxy 104, then user's requests will be sent to the target web service 128 from the 33$^{rd}$ IP address, i.e., 192.0.0.33, of that range, and so on. Exemplary commands entered by the user (user's device) presented below:

curl-x proxy:3001 https://target.com #comment: request received by ingress proxy, then will be send to and then resend from outbound-proxy-node with its IP address 192.0.0.1 to the target web service curl-x proxy:3033 https://target.com #comment: request received by ingress proxy, then will be send to and then resend from outbound-proxy-node with its IP address 192.0.0.33 to the target web service A user request can be routed to another outbound proxy server 122 (typically, outbound-proxy-node) depending on which ingress proxy 104 server's TCP/UDP port the user's request for proxy service (access to target) was sent to.

In another embodiment, the user can also request an outbound proxy node 122 from a specific country. Using his credentials comprising a country/city code in the user's request to access the target web service 128, for example, user-bob1-country-us:pwd—thereby, all his requests—will be routed through outbound nodes 122 residing in the USA (according to proxy service configuration and the list of applicable outbound nodes 112, assigned/granted to that user):

curl-U user-bob1-country-us:pwd-x socks5://dc.Proxy-Provider.io:8000 https://ip.ProxyProvider.io The presented embodiments and exemplary use-cases can be implemented/employed for internet proxy services with SOCKS5-type protocol, as well as with HTTP[S] proxy protocols. Using TCP/UDP ports and, optionally, additional parameters within the "username"-field text, it is possible to introduce the same functionality using SOCKS protocol (which actually is restrictive for such purposes, by its formats), as in proxy service implementations using HTTP [S] proxy protocols.

Figure 6:
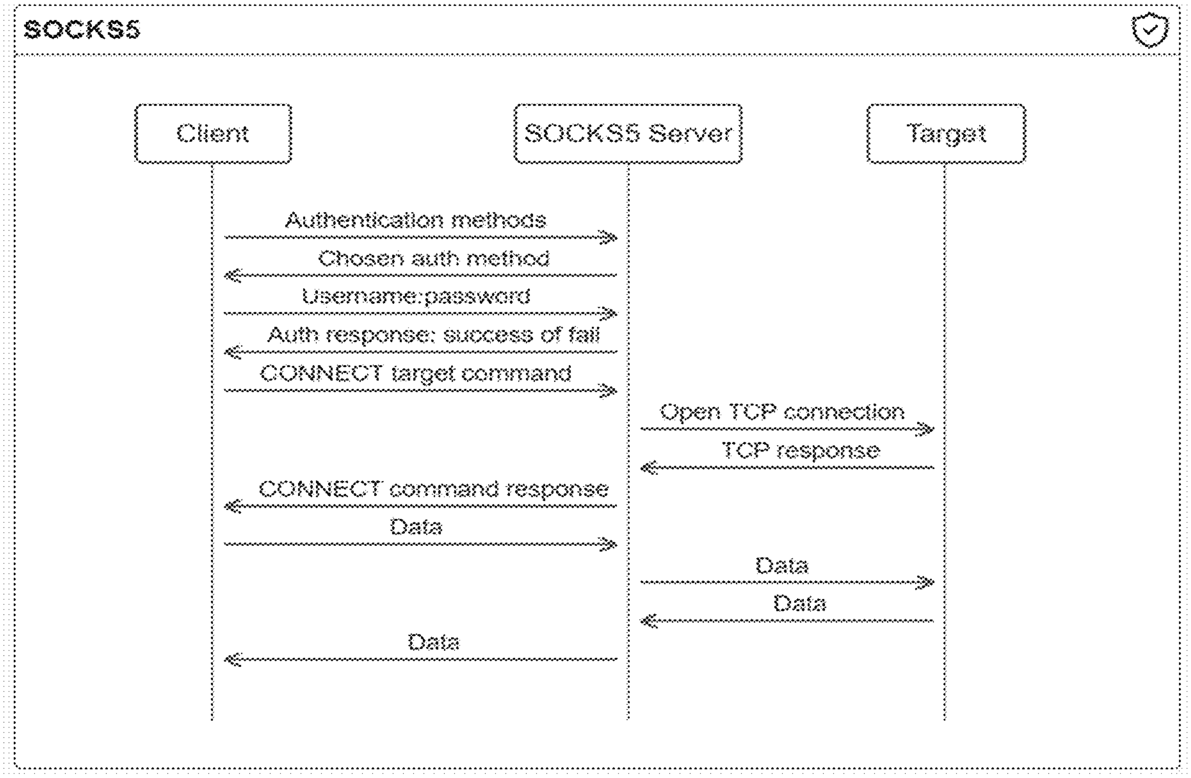
FIG. 6 depicts communication protocol diagrams for multi-hop SOCKS5 ingress proxy and exit node.
Figure 6:
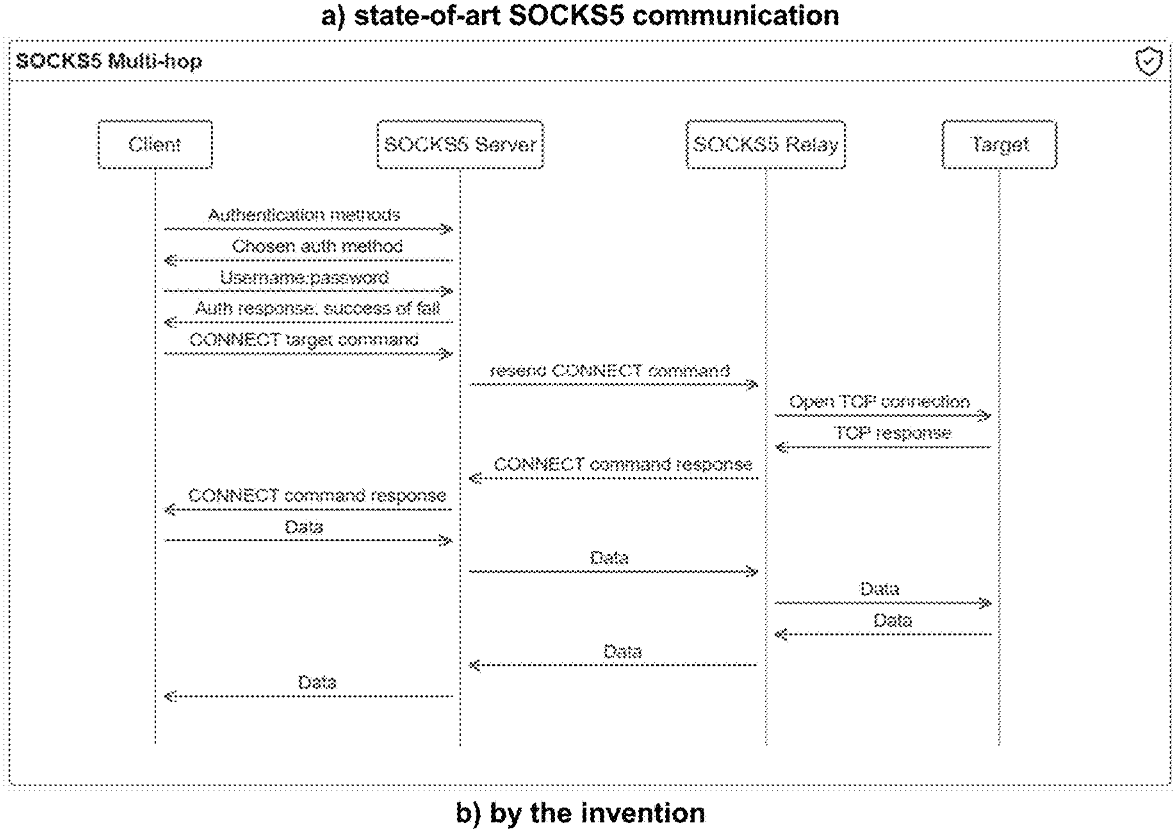

The 1st embodiment can be implemented using SOCKS5 proxy protocol defined in RFC 1928 without a need to provide the TCP/UDP port number as an extra parameter (e.g., in the "username"-field, as disclosed by the 2nd embodiment of this invention). As FIG. 6A shows, at the beginning of establishing a connection through a proxy, the state-of-art SOCKS5 node accepts the user's greeting and authentication request. In the 1st embodiment, these requests can be sent to SOCKS5 ingress proxy 104/110 using any TCP/UDP port. The user specifies the TCP/UDP port number when initiating the session, so even before the authentication VSOCKS node 110 already knows the user's selected TCP port. Thereby, VSOCKS node 110 can select an outbound node 126 (as specified in the list), to which the following command CONNECT from the user's device 102 will be forwarded. The user's request command-line is the same both in HTTP/HTTPS and SOCKS5 options, except that the protocol type is denoted to the ingress proxy node IP address. For example, using HTTP-type the command line is as: curl-x proxy-address:3001 http://target.com—here the protocol type is omitted for proxy-address:3001 because the curl program considers the proxy HTTP-type by default. It is possible to define the ingress proxy also by http://proxy-address:3001. Or even https://proxy-address:3001, if the connection to ingress proxy 104 is required to be encrypted.

Meanwhile, for SOCKS5-type ingress proxy 110, the curl command can be: curl-x socks5://proxy-address:3001 http://target.com—here the added prefix socks5://indicates to the "curl" program in which protocol-type to communicate with the ingress proxy 104. In all cases, the TCP port can be specified to the ingress proxy address, so the user selects the TCP port to connect to the proxy server when forming the session initiation command. Correspondingly, this TCP port selected by the user, is further used within ingress proxy nodes 106 or 110 to select a particular outbound proxy node 126.

A more complex request analysis and scenario of selecting the outbound node 126 may be considered:

the user can define the outbound node 126 in multiple ways: (a) defining TCP port to the ingress proxy; (b) defining TCP port as a part of "username", or (c) defining the direct IP address of the outbound node 126 as a part of "username";

forming a SOCKS5-type request; and omitting the ingress proxy protocol type in the user request, then the user request may be managed in the following sequence:

(a) user's request is sent from user's device 102 to the HTTP ingress node 106 at a certain TCP port;

when the HTTP ingress node 106 recognizes that the user's request is not a HTTP/HTTPS proxy request, then it resends it to the SOCKS5 ingress node 110 through their mutual interconnection 108, using the same TCP port (the same can apply if the user's request is a HTTP/HTTPS proxy request);

(c) the SOCKS5 ingress node 110, after receiving the request from the HTTP Ingress node 106, first, extracts the user name and extra parameters from the "username" field. Then, it completes the user authentication stage. If the authentication has been successful, then:

(d) the SOCKS5 ingress node 110 analyzes whether there was specified in the "username"-field an IP address for the Outbound proxy 126. In case it is specified, the ingress node 110 uses it by highest priority;

(e) otherwise, the SOCKS5 ingress node 110 may analyze whether there was specified in the "username"-field a TCP/UDP port for selecting an outbound proxy. In case it is specified, the ingress node 110 selects a particular outbound proxy 128 from a list of associations between TCP/UDP port numbers and IP addresses;

(f) otherwise, the SOCKS5 ingress node 110 analyzes by which TCP port the user's request was received from its counterpart HTTP ingress node 106. Then SOCKS5 ingress node 110 verifies the list to find an IP address of a particular outbound proxy 128 according to said TCP port number; in case of the presence of such IP address, the outbound proxy 128 is selected.

(g) In the ultimate case, if neither IP address, nor DNS identifier was specified, nor the outbound proxy was found in the "TCP/UDP port-to-IP address" associations list, then the SOCKS5 ingress proxy 110 selects the outbound node 128 in a random manner, and further uses it for connecting the user's device 102 with the target web service 128.

Notwithstanding the above scenario (a)-(g), other scenarios also are possible. For example:

the request from the user's device 102 may be sent to the SOCKS5 ingress proxy 110 directly, but not through the HTTP ingress 106. In this case, step (b) will be omitted, and step (c) will follow after step (a), where the user sends his request directly to the SOCKS5 Ingress proxy 110;

in another scenario, all steps except (b) may be performed by the HTTP ingress proxy 106 only, not transferring the request to the SOCKS5 ingress 110;

in any further scenarios, any of steps of (c), (d), (e), and (g) may be optional (included or omitted). For the $1^{st}$ embodiment, the essential steps are steps (a) and (f), while the other steps are optional. Note that the scenario (a)-to-(g) is exemplary only, demonstrating how sophisticated user's request analysis and selection of an outbound proxy may be done within ingress proxy 104.

Broader $1^{st}$ embodiment. Furthermore, the request addressed to the ingress proxy 104/106/110 at a particular TCP/UDP port number may be translated/converted not necessarily to an IP address of a particular outbound proxy node 104. By the broadest concept of the $1^{st}$ embodiment, the user's selected TCP/UDP port at the ingress proxy 104/106/110 can be considered as a parameter or group of parameters which can be applicable for configuring the proxy service for that user. The TCP/UDP port number is defined by two bytes, being able to represent 65,535 number values. Otherwise, these 2 bytes can be interpreted as 2 independent bytes having 255 values each, or 4 bit-quartets having 15 values each, and so on. Therefore, requesting the ingress proxy 104/106/110 at different specific TCP ports may define a variety of proxy service options assigned to the user. All values encoded by the TCP port number are decoded and then mapped to the service configuration parameters. Meanwhile, mapping the TCP port number to the outbound node 122/124/126 IP address is one of most preferred sub-embodiments.

For example, the TCP port number used to request the ingress node 104/106/110 can encode the country by the first byte, and a user's own identifier of the outbound node in that country by the second byte of the 2-byte field. Although selecting the outbound node 122/124/126 within the ingress node 104/106/110 will be performed using the same or similar mapping table/list, such specific selection format may be more convenient for the user.

Therefore, the $1^{st}$ embodiment, by its broadest sense, is defined as configuring for the user assigned (granted) proxy service, according to the value of the TCP port number, at which the user sends his request for the proxy service to the ingress proxy 104/106/110.

Proxy TCP/UDP ports to select an exit-node IP. The ingress proxy server 104 can have multiple exit IP addresses or connections to multiple remote outbound-proxies 122 with their own IP addresses, for the user to use. Proxy service HTTP and SOCKS5 protocols do not provide means to select a desired outbound proxy node 122. However, the ingress proxy server 104 modified by the invention can route requests through a specific outbound proxy 122 depending on which ingress proxy server's 104 TCP/UDP port the user used for its request for proxy service.

There are several specific applications or uses of the above described solution where such method (of selecting an outbound proxy 122 by selecting a TCP/IP address of the ingress proxy 104) can be applied effectively:

(a) Web scraping. Scraping sometimes needs to ensure that multiple requests are sent from the same IP to maintain active sessions, and to realize this functionality consistently in all protocols we use a port-to-IP mapping. For example, an IP address between multiple requests may be retained to bypass blocks (when the target blocks requests from different IP addresses).

(b) Sticky session by user. In well-known proxy services, the parameter of setting a sticky session is notified by the user to the proxy infrastructure, and then the proxy infrastructure involves its internal means to support the session to be sticky. In the present invention, the user can select either to have a sticky session or not. This is made straightforwardly choosing to keep the session through one TCP/IP port (translated to a single proxy and its IP address);

(c) Balancing proxy sessions by user. As in the above example/case, the balancing is made straightforwardly choosing to keep the session either through one TCP/IP port (translated to a single proxy and its IP address), or through several TCP/IP ports. Thereby, the session is balanced through several proxies/IP addresses;

(d) Exit-node failover by provider. In this case, the service provider's infrastructure, upon detecting an exit-node being shut down, selects another exit-node from the neighborhood (for example, randomly selecting), and automatically relates the IP port with this new proxy. In such a case, the user is notified of such change. In some cases, automated change of the proxy and its IP address can imply a block from the target, but in many other cases of using proxy service, such automatic failover helps the user's device to retain the use of proxy and continue its data session through the proxy service to the target. The ability to change IP addresses is more to ensure that the service operates with as little interference as possible and that no user intervention is required. If the proxy in use ceases working, the TCP session is terminated and the user needs to send the request again. However, changing the IP address without the user's intervention, automatically by the service provider, ensures that no changes need to be made in the request itself, the request simply needs to be repeated, but not modified. The service provider adds another proxy in the user proxies list and relates that new proxy with the same port number. The user does not have to change anything in the proxy service configuration, just repeat the request.

Everything the user needs to know is an ingress proxy 104 IP address and a TCP/IP port range, for accessing the corresponding assigned range of remote outbound-proxy nodes 122. The user does not even need to know which TCP/UDP port maps to which IP address/outbound-node 122. Selecting exit-IP addresses by using TCP/UDP port numbers allows the proxy service provider to replace non-working outbound proxies 122 without a need to inform users about such changes and does not require users to update their assigned list of outbound proxies 122.

Forming TCP/IP ports related to outbound proxy nodes. The service provider (or the user itself through a self-service) forms a list of IP addresses (of outbound proxies 122) arranged in a certain order and passes this list to the ingress proxy 104. The ingress proxy 104, according to the first TCP/UDP port set in its configuration (for example, 8001), associates the TCP/IP ports with the IP addresses from the list. The self-service module also knows what the TCP/UDP first port is, therefore, the self-service module generates a list of IP addresses for the user and also relates through which TCP/IP port the corresponding outbound proxy 122 IP is to be used.

Figure 1:
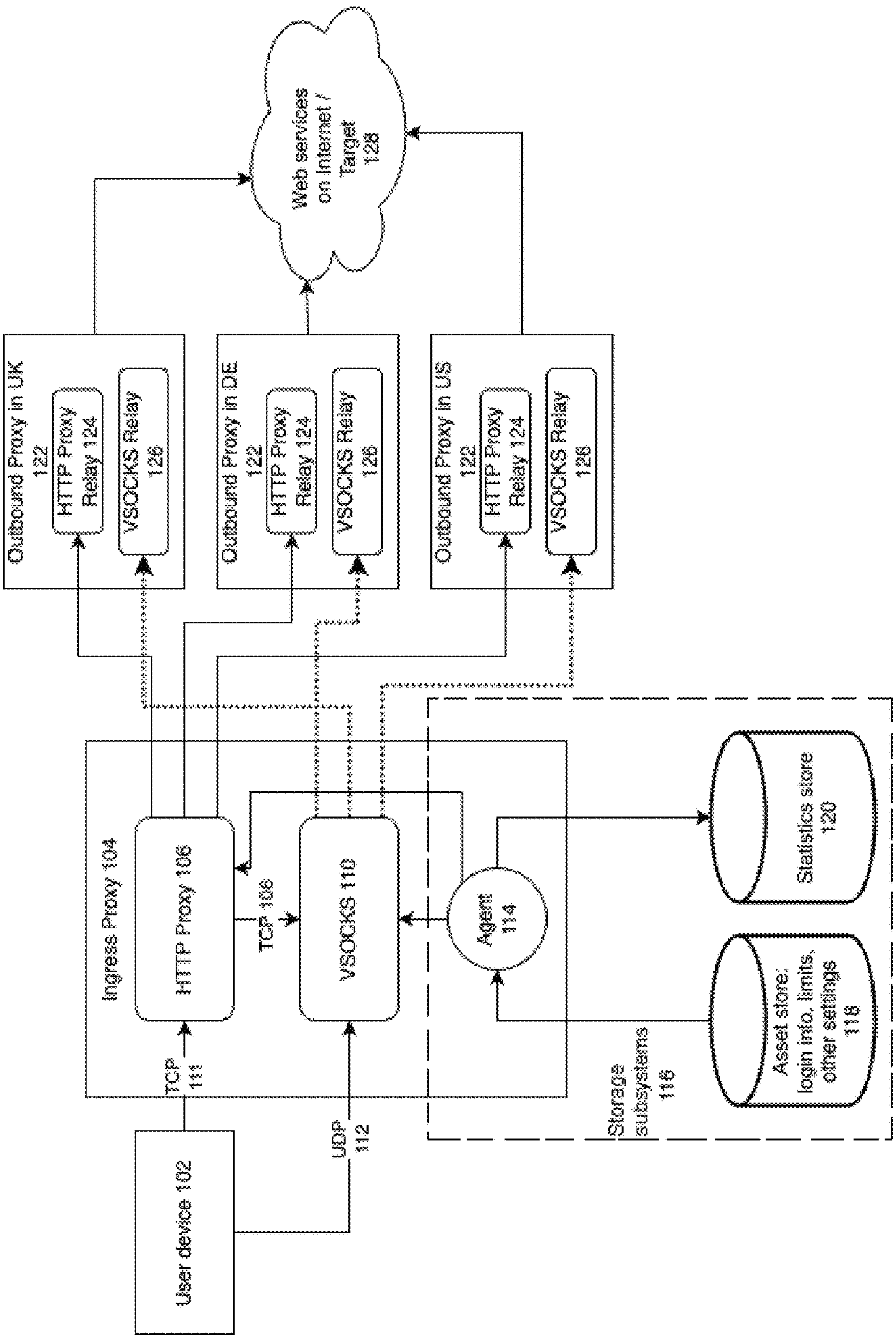
FIG. 1 presents a general diagram of the proxy infrastructure according to the present invention, comprising: user device 102; target web service 128; ingress proxy 104/106/110; outbound proxy nodes 122/124/126; agent 114; proxy service information storage subsystems 116/118/120.

The proxy service infrastructure and the implementation of the user's request is presented in FIG. 1. A request from a user's device 102 is received by an ingress proxy 104, where ingress proxy 104 is a component within the service provider infrastructure.

The user's request can be sent to the ingress proxy 104 either using TCP connection (received by HTTP proxy 106) 111 or by UDP connection (received by VSOCKS 110) 112 protocols. If the request is sent using HTTP protocol 111, it is received and analyzed by the HTTP proxy 106 within the ingress Proxy 104. If the request is received using UDP 112 protocol, then it is received and analyzed by VSOCKS 110 proxy. The HTTP proxy 106 is connected to and communicates with VSOCKS 110 proxy by TCP 108 connection.

The HTTP proxy 106 or the VSOCKS 110 proxy, both work as the ingress proxy 104, analyzes the content of the user's request. Most specifically, the ingress proxy 104 analyzes the TCP/UDP port number and/or extra parameters (e.g., country code/CC) inserted in the user's request. Accordingly, the selection of outbound proxy nodes is made. If the user's request indicates a specific IP address, then the user's request is just routed (forwarded) through that selected outbound proxy node. If the user's request indicates a specific country, then the ingress proxy 104 element (either the HTTP proxy 106 or the VSOCKS 110) selects the IP address and the outbound node from the list of IP addresses assigned to the user that correspond to the user's indicated country. FIG. 1 is an exemplary representation which depicts three different countries where outbound proxy nodes 122 are allocated—the UK, Germany, and the USA. This list of countries is not limiting, and there can be any outbound proxy nodes in any country of the world. Depending if the connection used HTTP or SOCKS5 connection, the element in the outbound proxy 122 receives the request and sends that request to the web service on the internet (the target) 128. If the request is sent using HTTP connection, then HTTP proxy relay 124 within the outbound proxy 122 sends the request to target 128. If the request is sent using a SOCKS5 connection, then VSOCKS relay 124 within the outbound proxy 122 sends the request to target 128. Once the request is implemented, the reply is delivered to the user's device 102 by the same route.

FIG. 1 also shows an agent 114 as a part of the ingress proxy 104 infrastructure. The agent 114 communicates with VSOCKS 110 and delivers information from the storage subsystem 116. The agent 114 also communicates with the HTTP proxy 106 and also delivers information from the storage subsystem 116.

The storage subsystem 116 is based outside of the proxy service infrastructure and stores or accumulates different information. For example, storage subsystem 116 can include the asset store 118, comprising information about users' logins, data limits set to particular users, and other users' account settings.

The storage subsystem 116 can also include a statistics store 120. The statistics store 120 holds information about data describing a user's usage of the proxy service, such as:

1) HTTP and SOCKS proxies 122: their activity status, number of users using a particular proxy, overall amount of data flow (load), number of requests performed through particular proxy, etc.;
2) data about usage of data of individual users; and
3) information about access logins.

The agent 114 also collects statistical data from VSOCKS 110 and sends it to the statistics store 120. The agent 114 sends a request to the HTTP proxy 106 and VSOCKS 110 for the information collection. The HTTP proxy 106 and VSOCKS 110 does not communicate with the agent 114 until the agent 114 sends the requests.

Figure 2:
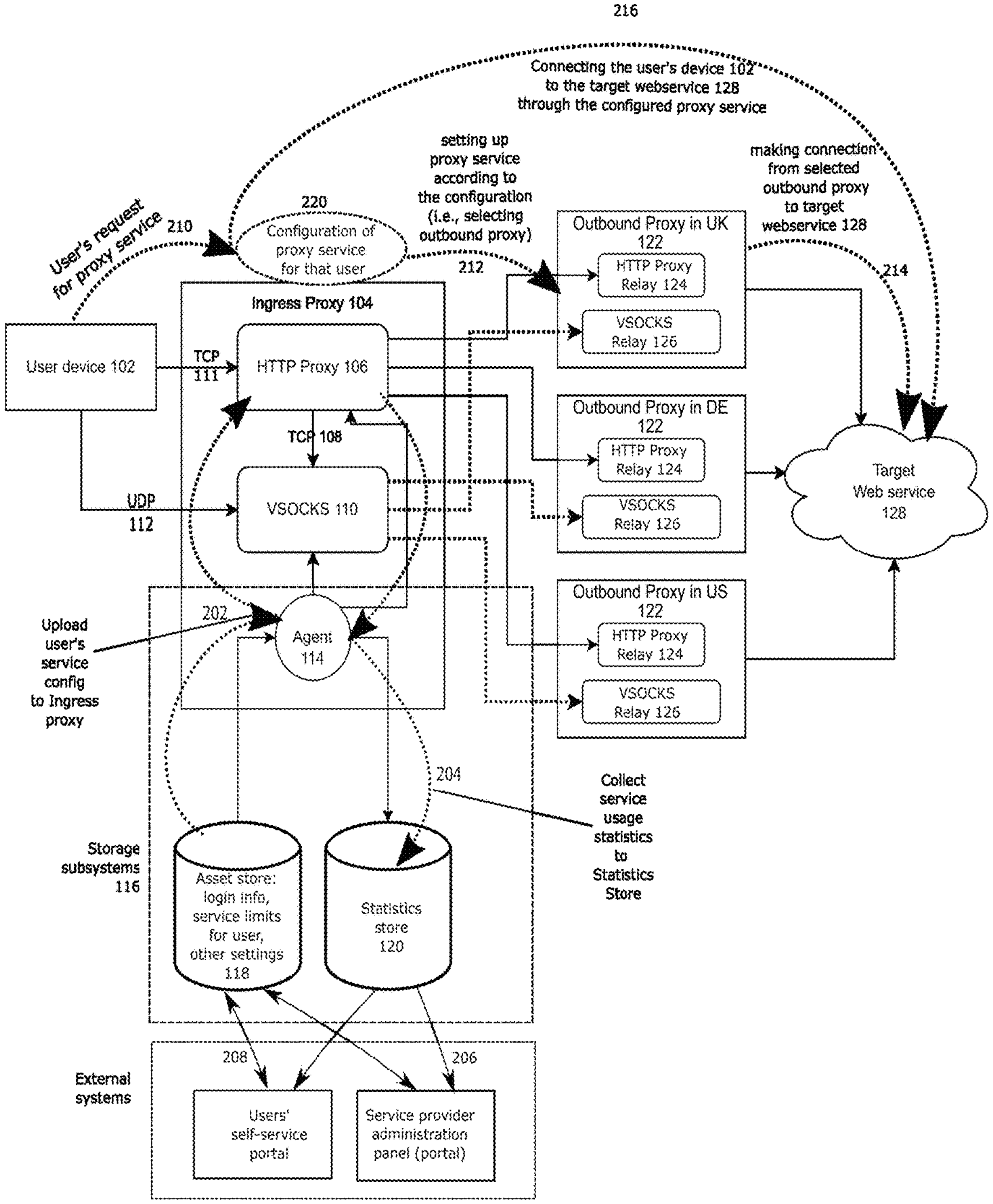
FIG. 2 presents an embodiment of the method-managed transactions route how the user's request from the user device 102 is sent by TCP or UDP to the target web service 128; the user's device 102 defines the outbound proxy node 122/124/126 within the user's request; this selection can be done for a particular outbound node 124/126 or just an ingress proxy TCP/IP port number can be indicated in the user's request; the user's request is received by the ingress proxy 104/106/110; according to metadata in the user's request, specifically, TCP/IP port number—the ingress proxy 104/106/110 selects the outbound proxy node 122/124/126 for providing the user's request exit to the target web service 128.

FIG. 2 presents an exemplary embodiment of the method-managed route how the user's request from the user device 102 is delivered to the web target 128: 1) the user's device 102 defines the outbound proxy node 122 within a request; 2) a selection can be done for a particular outbound proxy node 122 or just an ingress proxy TCP/IP port number can be indicated in the user's request; 3) the user's request is received by the ingress proxy 104; 4) according to the user's request metadata information, specifically, TCP/IP port number—the ingress proxy 104 selects the outbound proxy node 122 for providing the user's device exit to the web target 128.

Figure 3A:
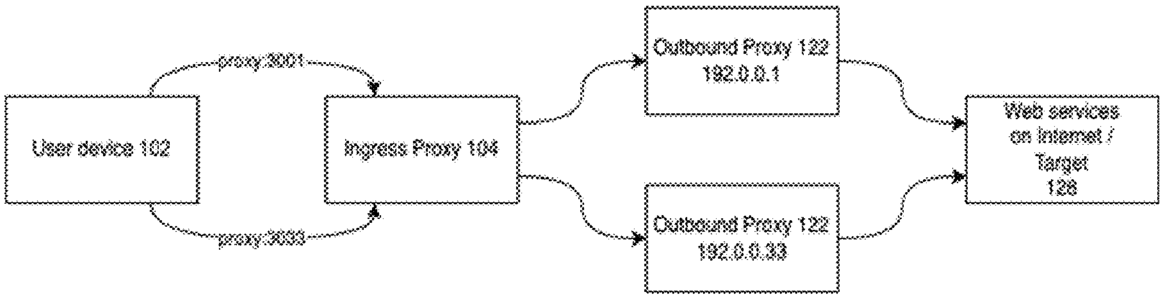
FIG. 3A presents an exemplary diagram of sending a user's request to the target web service 128 on the Internet. The user's request selects an exact outbound proxy node 122, by specifying the correspondingly assigned (by a configuration) ingress proxy TCP/IP port number (in the example case either 3001 or 3033). The corresponding outbound node is selected (in the example case either with IP address 192.0.0.1 or with IP address 192.0.0.33).

FIG. 3A presents a scenario where the user's request indicates an exact outbound proxy 122—the request indicates a specific proxy number, such as 3001 or 3033. Then the particular matching outbound proxy is selected, as depicted, the outbound proxy with IP address 192.0.0.1 or outbound proxy with IP address 192.0.0.33.

Figure 3B:
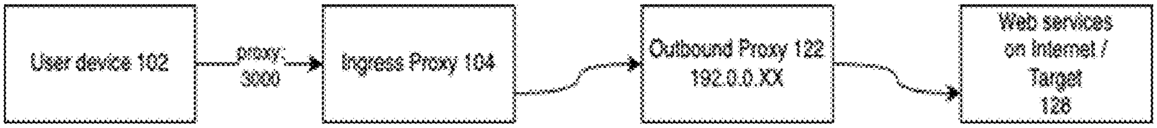
FIG. 3B presents another exemplary diagram of sending a user's request to the web service. The user's request indicates a particular TCP/IP port number of the ingress proxy (e.g., 3000) which is configured for selecting a random outbound node from a pool of nodes assigned to the user. The ingress proxy 104, upon obtaining request at the TCP/IP port 3000, selects a random outbound node 122 from the list of outbound nodes (192.0.0.XX) that the user has access.

FIG. 3B presents another example, where the user is allowed to indicate only some parameters for selecting the outbound proxy 122, but not to define a specific outbound proxy 122. If the user's request indicates a particular TCP/IP port number of the ingress proxy 104 (such as proxy: 3000), then the ingress proxy 104 is configured to choose and selects a random outbound proxy 122 (192.0.0.XX) from the list of outbound proxies 122 (the list is assigned to the user within his proxy service scope).

Figure 4A:
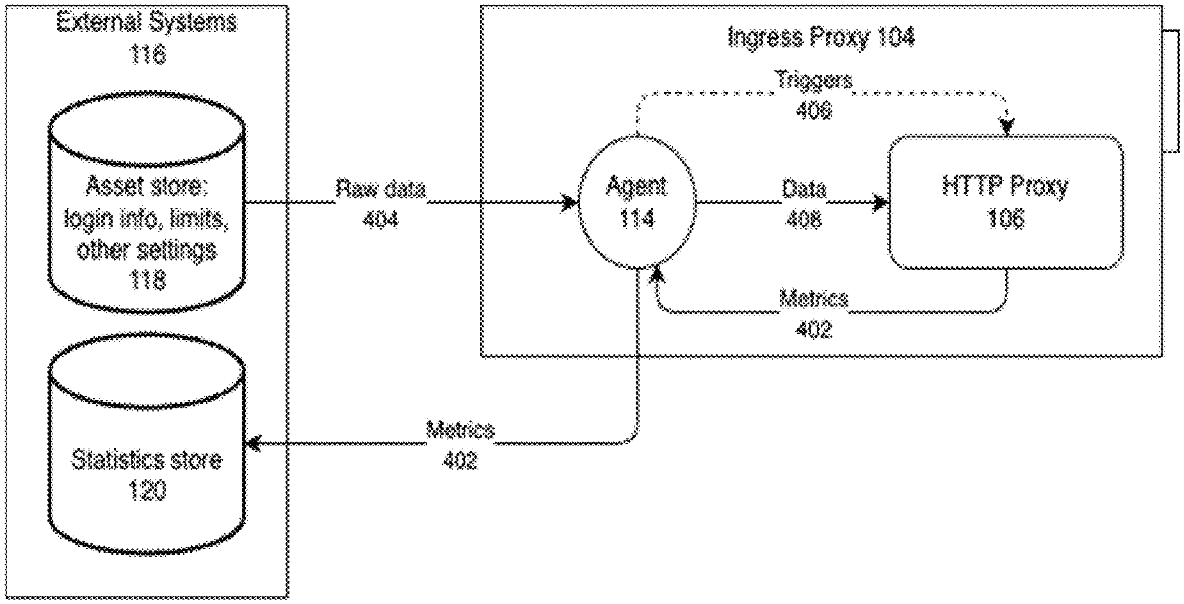
FIG. 4A presents an exemplary diagram of communication where the ingress proxy (HTTP proxy and VSOCKS) gets user information from external system 116 using/through agent 114 (proxy service information asset 118 and statistics store 120).

FIG. 4A describes current synchronization of information between the ingress proxy 104 and storage-subsystem 116. The agent 114 interacts with other systems using complex protocols (queue, REST API, stream, or similar). The agent 114 fetches raw data 404 (for example, in YAML format: "-id: user-unique-id; brand: brand1; parent: parent-unique-id; revision: 10; products:-product: shared_dc; username: user2"), filters and transforms the data 408 to a needed form and feeds it to a proxy/service—ingress proxy 104—in real time. If needed, the agent 114 may send an additional trigger 406 to the HTTP proxy 106, for example, to consume that supplied data or do some other actions with that supplied data. The agent 114 also can collect important metrics 402 from a proxy/service and report these collected metrics 402 using the same complex protocols (queue, REST API, stream, etc.).

Figure 4B:
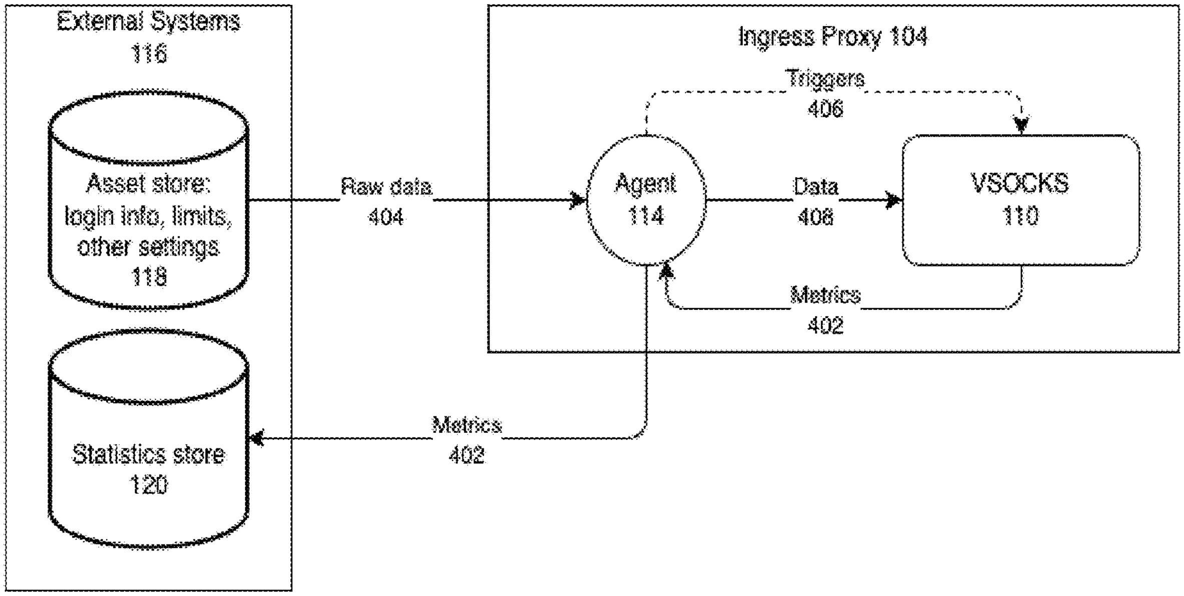
FIG. 4B presents another exemplary diagram of communication between the ingress proxy 104/110 and the storage subsystems 116 (proxy service information asset 118 and statistics store 120).

FIG. 4B describes another embodiment of the synchronization of information between ingress proxy 104 and storage-subsystem 116, wherein the information is received by the VSOCKS 110. In FIG. 4B, the communication and exchange of information remain the same as described in FIG. 4A, but the actor instead of the HTTP proxy 106 is VSOCKS proxy 110 (based on SOCKS5 proxy protocol).

2. Composite "Username" in the User's Request for Service

The disclosed embodiments overcome restrictions known in the state-of-art SOCKS5 proxy protocol. The HTTP/HTTPS proxy and SOCKS5 protocols are supported in a proxy service infrastructure, and they provide various options to control how user requests are routed through one or more proxy nodes of the proxy infrastructure.

HTTP/HTTPS-type proxies can use/involve (typically, not restricted to) additional metadata, parameters, or headers in users' HTTP requests for proxy service.

However, a more prominent internet proxy protocol, SOCKS5, does not provide any means to transfer additional data which could be used as control parameters on how to route the user request through the proxy service infrastructure/cloud. Both protocol types (HTTP/HTTPS and SOCKS5) support authentication using credentials (a "username"+ "password" pair).

According to the embodiment, by adding additional data (metadata) to a "username"-field, the solution/method disclosed herein enables one to extend essentially the functionality of a managed proxy service. The user can include in his request for proxy services any further additional fields, such as identifiers of exit nodes 122/124/126, country code, by defining those in the user's request "username" field. This allows to solve important limitations when implementing proxy services based on the SOCKS5 protocol.

Notwithstanding advantages obtained using this embodiment with SOCKS5, this solution/method can be also used with other proxy protocols (HTTP/HTTPS), although not having restrictions to provide metadata in the service user's request line or command. According to the 2$^{nd}$ embodiment, the "username"-field is employed to include additional metadata and service configuration parameters in both known proxy protocols.

Problem. The problem to solve is how to provide required data with such a restricted SOCKS5 proxy service request format, consisting of (comprising only) fields of a user's "username" and "password".

Solution. The user's password cannot be allowed or is inconvenient for providing additional configuration parameters for the proxy service (e.g., the password is only processed by authentication modules, and not allowed to be processed by other software modules). However, the "username"-field suggests a configurable option on how to provide proxy service metadata and parameter values with the user's request for the proxy service. And further, how to process such a proxy service request, and how to provide information to the proxy service provider with the relevant data values in the user's request.

Effects/advantages. The present method allows one to employ as many proxy service configuration options as needed in the user's request line comprising only fields of "username" and "password". The example is the known "state-of-art" proxy protocol SOCKS5.

Further, this method can be used also with other proxy protocols being not so restrictive as SOCKS5. For example, HTTP or HTTPS proxy protocols. This can provide a unified/uniform control method for accessing proxy services for users who may use more than one different protocol for using different proxy services provided by proxy providers.

Using this method, in the user's name field "username", the user additionally enters different commands that are data tagged by a proxy service provider. Inserted data values are separated by dashes, commas or semicolons from the username. The proxy service provider compares inserted data with the set of values, and in this way decodes the information inserted in the "user name" field. For example, in the user's request the proxy service data values are paired with a key and joined with a dash. The set of values are prepared for each category of entries, e.g., all countries are listed in one set of values, and so on.

Example: how to configure proxy service by selecting a remote proxy from a list of many available exit nodes, defining the exit node by country code where the exit node resides and where the target is.

For example, a user chooses to use this encoding to transfer the username and additional data in the username field:

a. values are paired with a key and joined with a dash: "user-ben1";
b. all key value pairs are joined to a single string using dashes: "user-ben1-country-us".

Supported keys and values can't have joining characters (in this case dashes) and colons to be compatible with HTTP proxy protocol, which uses a colon to separate the username from the password.

The client connects to a proxy server using the SOCKS5 protocol and wants a request to be routed through a proxy located in the UK. The client modifies his username "ben" like this: "user-ben-country-uk".

The proxy server checks whether the field "username" contents matches the metadata provision syntaxis pattern (like the "username" field in its text having some special separating characters, e.g. dashes "-") and then extracts a real user's name and further, any additional data parts, separated each from others again with the aforementioned separating characters (e.g., dashes "-"). Using the extracted username, the request can be authenticated for its user, and, further, using the extracted additional data the request can be routed accordingly through the proxy service infrastructure to the target web service 128.

This embodiment is presented in FIG. 2. Once the user's request having the user's name (user—Ben) composed with the country code (country—UK) in the "username" field is received and decoded as separate parameters "user" and "country", then the ingress proxy 104 selects the outbound proxy 122 which would satisfy the user's indicated criterion: the outbound proxy 122 to be allocated in the UK. In the present example, the outbound proxy 122 in the UK is selected and the user's request is routed through that outbound proxy 122 to the target web service 128.

3. Multi-Hop Proxy Service in SOCKS5

Problem. One more related embodiment of the invention is a multi-hop implementation in proxy protocols, services, and infrastructures. A Multi-hop proxy service means that the user's requests are delivered to the target web service 128 not through a single proxy node/instance (such as a single proxy server) but through a proxy infrastructure path comprising two or more proxy nodes, in other words, a managed network of proxy nodes. Such multi-hop proxy infrastructure can be implemented using, for example, HTTP/HTTPS proxy node 106 that enables the user, from his device 102, to connect to a single ingress proxy 104/106/110 and then to select some further proxy nodes (outbound nodes 122/124) on the path, e.g., by means of extra parameters in the "username" field of the user's request, to configure the proxy infrastructure, in which the further node/nodes 122/124 are selected, through which the user's request then is directed/routed to the target web service 128.

However, such multi-hop implementation currently is not available for SOCKS5 protocol-based proxy services. The essential problem solved by the 3$^{rd}$ embodiment: The "state-of-art" SOCKS5 protocol does not provide an inherent means for implementing managed multi-hop proxy services. State-of-art SOCKS5 is a specialized proxy protocol for implementing secure proxy services. Furthermore, SOCKS5 does not provide appending extra/optional parameters in the user's request, when the user requests a connection through the SOCKS5 proxy to a target web service 128. The problem of the state of the art is that there exists only a single-hop function in SOCKS5 protocol. Current implementation allows one to use multi-hop functionality in the connect requests, in such a way that user request can enter the ingress proxy node 104 but exit through another outbound proxy node or multiple outbound nodes to the target web service. In a normal way SOCKS5 requires connecting directly to an outbound proxy node to reach the target.

Therefore, known implementations of SOCKS5-type proxy services are limited to operating on a single SOCKS5 node, or on a group of independent single SOCKS5 nodes for providing some wider area proxy services.

While centralized management of a group of SOCKS5 nodes is possible by some central management server, users wishing to use multiple proxy nodes in distant areas (e.g., different countries) still have to use multiple proxy service ingress points for exiting to web services 128 in those countries. Meanwhile, multi-hop SOCKS5 proxy service solutions are not known currently, but such solutions are crucial for wide-area/global-area proxy services and their scalability, availability, security, speed and latency optimization, and for better user experience.

Solution. The 3$^{rd}$ embodiment is targeted specifically to SOCKS5-protocol-based proxy services. According to the previous embodiments (1$^{st}$ and 2$^{nd}$) of the present invention, it is possible to append some extra configuration parameters into the "username"-field of the user's request, as already explained in the previous embodiment. Further, SOCKS5 protocol does not preclude (does not restrict) to split the SOCKS5 proxy protocol of user's device 102 connection to web service 128 into two protocol phases separated and implemented into at least 2 SOCKS5 servers. For example:
1) the user greeting and authentication phase is performed in one SOCKS5 server/node, and
2) the "connect" command to the target web service 128 is implemented in the second SOCKS5 server/node.

The known SOCKS proxy communication protocol is presented in FIG. 6A. The new solution implemented in the present embodiment is depicted in FIG. 6B. FIG. 6B presents SOCKS5 protocol functions—how to implement a multi-hop proxy connection between the user device 102 and the target web service 128 through at least two SOCKS5 nodes where the first node is the user's requested ingress proxy 104/110 and the second node is at least one outbound node 122/126. For wide-area SOCKS5 proxy services, it is apparent that a plurality of outbound nodes 122/126 is necessary.

SOCKS5 server (operating as the ingress proxy 104) accepts a new connection (initial greeting, by protocol) from the user device 102 and then performs a negotiation of authentication protocol later carrying out authentication steps.

The user may be identified and authenticated by SOCKS5 ingress proxy 110 using different types of the user's identifier, such as:

- username/password, which is standard in the SOCKS5 protocol;
- a white-listed IP address, from which the user makes a request for the proxy service; or
- a combination of the both above.

Further, the same SOCKS5-type ingress proxy VSOCKS 104/110 receives a "connect" command from the user device 102 instructing the ingress proxy 104/110 to connect to the target web service 128. At this moment, the ingress proxy 104/110 by itself does not connect to the target web service 128 but selects available SOCKS5 outbound proxy (outbound-relay) 126 and opens a new TCP connection to it. After this step, the ingress proxy 104/110 delegates the received "connect" command to the selected SOCKS5 outbound node 122/126, and then the outbound node 122/126 connects to the target web service 128 by its own IP address. In further steps, the user's device 102 communication with the target web service 128 continues. This workflow is presented with sufficient details in FIG. 6B.

Such SOCKS5 relay nodes 122/126 can be configured in their own firewalls, to accept TCP connections only from their known other SOCKS5 servers. In this embodiment, such known SOCKS5 servers are one or more SOCKS5-type ingress nodes 104/110. When any SOCKS5 proxy relay 122/126 receives a new TCP connection initiated from another SOCKS5 server, it receives a CONNECT command delegating to connect to the target web service 128. Using standard parameters of the CONNECT command, the SOCKS5 proxy relay 122/126 opens a TCP connection to the target web service 128. If this TCP connection is successful, then a confirmation response is sent back by the proxy relay 122/126 to the SOCKS5 ingress proxy 104/110. The latter will resend the confirmation to the user device 102. If the connection to the target 128 fails, then the SOCKS5 proxy relay 122/126 closes the connection to SOCKS5 ingress node 104/110, and afterwards the same connection closure is done by the ingress node 104/110 to the user device 102.

In a specific basic embodiment of such SOCKS5 multi-hop proxy service, the SOCKS5 ingress proxy 104/110 may select a proxy relay 122/126 in a random manner, e.g., randomly from a pool of its known proxy relays 122/126. This implementation does not require any additional parameters to append into the user's request and to provide to the SOCKS5 ingress proxy 104/110. The ingress proxy 104/110 itself internally decides which proxy relay 122/126 to choose from the pool. This basic embodiment is operational and can be sufficiently effective for some kinds of users and proxy applications. However, it still may be too restricted, because it does not provide the possibility for the user device to configure a manageable proxy service assigned/granted by the service provider.

A further improvement of the above described SOCKS5 multi-hop proxy solution would be to include additional parameters in the user's request, which would allow for the user to control the proxy relay 122/126 selections. This can efficiently serve the 1st and 2nd embodiments providing such functionalities to the SOCKS5 protocol which itself does not specify such features of appending service parameters in the user's request.

Combining the 3rd embodiment with the 1st embodiment, it is possible to manage selection of proxy relays 122/126 by specifying a TCP port number by which the user's request is directed to the SOCKS5 ingress node 104/110. As explained above, the 2-byte TCP number can be used in various configurations, to specify the user's required proxy relay node 122/126. Further, if the user's request for SOCKS5 protocol is first directed to the HTTP ingress node 106, and then from here redirected to the SOCKS5 ingress node 110, it is essential that the TCP port number by which the HTTP ingress 106 re-sends the request to the SOCKS5 ingress node 110 preserves the original Ingress TCP port number where:

- either the original ingress TCP port number is not changed when re-sending the user's request from the HTTP ingress node 106 to the SOCKS5 ingress node 110 at the same TCP port thereof; or
- the original ingress TCP port number is forwarded from the HTTP ingress node 106 to the SOCKS5 ingress 110 using other means of the request transfer protocol 108: for example, it may be transferred by appending the original ingress TCP port number into the SOCKS5 "username" field as a service parameter, from which the SOCKS5 ingress node 110 will find out the original ingress TCP port number at which the user's request has been sent.

Further, it is important that the SOCKS5 ingress node 110 would have a mapping table, which relates the TCP port number values with the proxy service configurations, specifically, with the IP address of the selected proxy relay 122/126. Under such conditions, upon the user's request to a particular TCP port of the SOCKS5 ingress 110, the ingress proxy 110 is able to select the user's specified proxy relay 122/126 and to make a TCP connection to it. Then, the second stage can be performed: the CONNECT command subsequently received from the user transmitted from the SOCKS5 ingress node 110 to the selected/connected proxy relay 122/126. After receiving the CONNECT command, proxy relay 122/126 identifies the target web service 128 address, and makes a TCP connection to it. Further communication through the established proxy session is continued by the user device 102.

When combining the 3rd embodiment with the 2nd embodiment, the only user-definable parameters in the user's SOCKS5 request are the "username" and "password" fields. The "password" field is more prone to mistakes and is meant to authenticate a user in a selected authentication method. Nevertheless, adding proxy service configuration parameters as a part of "username" field enables one to provide needed information to the service provider. The "username" field by SOCKS5 format allows up to 255 bytes/characters, which are quite sufficient parameter-specification space for configuring/management of sophisticated proxy services. Therefore, in this combination of the 3rd and 2nd embodiments, the SOCKS5 ingress proxy 104/110 may select a proxy relay 122/126 according to the user's defined parameters. Appending an identifier of the proxy relay 122/126 is necessary in the user's request. For example, the user may specify the IP address of the selected SOCKS5 proxy relay 122/126 in the request's "username" field to pass such a parameter to the ingress node 104/110:

curl "user-ben-exitnodeIP-192.0.0.33".

In another example, the user may indicate a particular TCP port of the ingress proxy 104/110 which (by the ingress proxy and service configuration) is mapped to a certain SOCKS5 proxy relay 122/126 and its IP address:

curl "user-ben-proxyIndex-33"

This proxy index 33 selects the SOCKS5 proxy relay 122/126 with its IP address 192.0.0.33.

In yet another example, the user may indicate a particular geographic country, in which SOCKS5 proxy relay 122/126 is selected in a random manner, for example: curl "user-ben-cc-UK-exitnode-random".

This user's command gives the instruction to the SOCKS5 ingress proxy 104/110 to select a random SOCKS proxy relay 122/126 in the United Kingdom geographical area.

Figure 5:
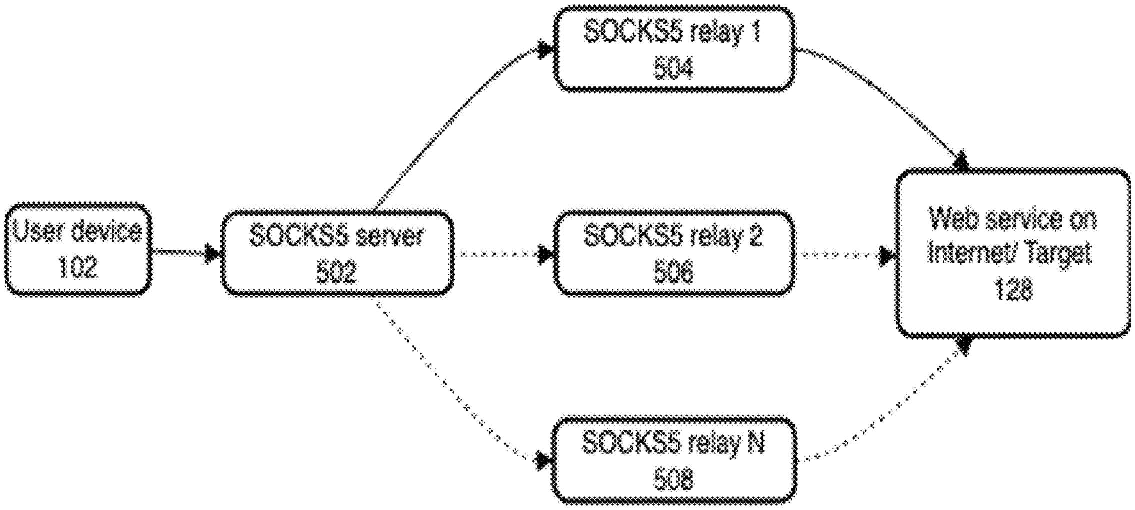
FIG. 5 presents an embodiment providing a multi-hop implementation of the proxy service using a SOCKS5 ingress proxy which is the single node for users' requests and management of the multi-hop proxy service. The ingress proxy is SOCKS5 server 502, which accepts and authorizes user's requests for proxy services. Further, ingress proxy 110, instead of connecting itself to the web service 128, delegates this function to any one of the 1, 2, or N SOCKS5-protocol relays 504, 506, and 508, thereby establishing a multi-hop proxy connection from the user's device 102 to the target web service 128.

FIG. 5 depicts how the client/user's device 102 connects to the target 128 using SOCKS5-type proxy service. The client/user's device 102 connects to SOCKS5 service/infrastructure cloud, wherein SOCKS5 server 502 has connections to several SOCKS5 relays (it can be numerous SOCKS5 relays, as demonstrated in the example by numbers 504, 506, 508, wherein 508 indicated N number of SOCKS5 relays). SOCKS5 server 502 chooses a single SOCKS5 relay—any one of 504, 506, 508—to send the user's request to the target 128.

Advantages. This SOCKS5 multi-hop solution eliminates the need for SOCKS5 service clients to connect to a plurality SOCKS5-type outbound proxies 122/126 directly and individually to each. Instead, it enables the user device 102 to enter a centralized service entrance (provided by SOCKS5 ingress proxy 104/110) which then routes the proxy connection through the most suitable SOCKS5 outbound proxy 122/126 to the target web service 128.

In this turn, such multi-hop SOCKS5 infrastructure, and automated routing of requests within it, enables proxy services providers to scale SOCKS5 infrastructures infinitely and improve their availability, security, speed and latency optimization, and provide a better user experience.

Multi-hop and parametrically managed proxy service implementations using SOCKS5 can enable routing of SOCKS5 (TCP and UDP) connections to SOCKS5 outbound nodes selected dynamically, but without using additional proxy technologies/protocols.

4. Combinations of Embodiments

Combinations of the disclosed embodiments are possible and mutually may be more effective. All embodiments use their essential functions allocated in a single component of the proxy infrastructure, i.e., in the ingress proxy 104/106/110 which serves as the central and deciding node of service provider for a user or group of users accessing that ingress proxy 104/106/110. Although there can be many ingress proxy instances available in different geographic regions, each user accesses proxy services assigned to him, only through a single ingress proxy 104/106/110 at a time.

Embodiment combinations can be implemented either in HTTP/HTTPS or in SOCKS5 proxy infrastructures/services. Several main combinations obtainable from the disclosures as described in the previous sections are summarized in Table 1.

TABLE 1

Main combinations of the 3 invention embodiments.

| Comb No. | Embodiment combinations | Description of combination | Is combination possible and effects in HTTP/HTTPS proxy solutions | Is combination possible and effects in SOCKS5 proxy solutions |
|---|---|---|---|---|
| 1 | Embodiment 1 + Embodiment 2 | Mapping ingress TCP ports + appending proxy service parameters in the "username" | Similar to Embodiment 1 on HTTP, and with the additional function to append proxy service parameters. Is not essentially more effective than Embodiment 1. | Possible, and is essentially effective, as it enables to use both ingress 110 TCP port number + append service parameters into the request "username" field, for more versatile proxy-service configuring by user in SOCKS5. |
| 2 | Embodiment 1 + Embodiment 3 | Mapping ingress TCP ports + multi-hop implementation of the SOCKS5 proxy | Embodiment 3 and thus this combination is not met in/intended for HTTP/HTTPS. It is a SOCKS5 protocol implementation solution for multi-hop SOCKS5 proxy services. | Essentially effective, as it enables to map the ingress TCP ports to multiple outbound nodes 122/126. For multi-hop Embodiment 3 provides user's selection of outbound nodes 122/126, where such selection is faster for some applications, e.g., web scraping. |
| 3 | Embodiment 2 + Embodiment 3 | Appending proxy service parameters in the "username" + multi-hop implementation of the SOCKS5 proxy | Embodiment 3 and thus this combination is not met in/intended for HTTP/HTTPS. It is a SOCKS5 protocol implementation solution for multi-hop SOCKS5 proxy services. | Essentially effective, as it allows a variety SOCKS5 multi-hop proxy service configurations, definable in user's request "username" field. Allows one to select outbound node directly by IP address, or country, etc. |
| 4 | Embodiment 1 + Embodiment 2 + Embodiment 3 | Mapping ingress TCP ports + appending proxy service parameters in the "username" + multi-hop implementation of the SOCKS5 proxy. | Embodiment 3 and thus this combination is not met in/intended for HTTP/HTTPS. It is a SOCKS5 protocol implementation solution for multi-hop SOCKS5 proxy services. | Most effective, as combines all 3 embodiments with their functionality, and this combination provides the most advantages and effects for SOCKS5-based wide/global-area manageable |

TABLE 1-continued

Main combinations of the 3 invention embodiments.

| Comb No. | Embodiment combinations | Description of combination | Is combination possible and effects in HTTP/HTTPS proxy solutions | Is combination possible and effects in SOCKS5 proxy solutions |
|---|---|---|---|---|
| | | | | proxy services, enabling in those services scalability, availability, security, speed and latency optimization, and a better user experience. |

Particularly, for SOCKS5 protocol-based manageable proxy services, all of the above-disclosed embodiments of the invention and combinations thereof are essentially effective and provide SOCKS5 proxy services with an unprecedented manageability, scalability, availability, security, speed and latency optimization, and a better user experience.

5. Embodiment No. 4: the agent 114 serving ingress proxies and proxy services for users. The aforementioned ingress proxy nodes are devoted for serving communications between users (users' devices 102) and target web services 128 on the internet. Each user has an individual configuration for that particular user assigned specific proxy service, according to which (the service configuration) the HTTP/HTTPS and SOCKS Ingress proxies 106 and 110 perform communicating functions for that user and his requested target services 128 and outbound node 122/124/126 options. There can be many service configurations for multiple users up-and-running in the memory of HTTP/HTTPS and SOCKS ingress proxies 104/106/110.

Further, the aforementioned service configurations may be dynamic/dynamically changing over time (during the provided service period). For example, when a first time the user signs an agreement for proxy services with a proxy services provider, then he receives an access to a self-service portal to order and configure a desired proxy service by himself. Alternatively, the provider's administrative persons may perform such initial service configurations using a Service Administration panel. In general, there can be various options how to specify/generate the initial proxy service configuration for a particular user, being ordered by that user.

Furthermore, the proxy service configurations for users can change over the time. For example, the user makes an additional order for more or different outbound nodes in his self-service account, or he may cancel some outbound nodes which are not needed for him anymore. By such change action, the modified/proxy service configuration for that user shall be recorded into a database, where all configurations for users are stored, for example, into the asset store 118. In another aspect, some proxy services for some users may be automatically restricted due to some objective reasons, for example, service fees not timely paid, or an assigned data quota limit reached for a certain service time period. These statistics may be collected and stored in another database, for example, Statistics Store 120 as depicted in FIGS. 1, 2, 4. Some service parameter thresholds reached may induce trigger-actions, according to which the proxy service for the user, or a part of it may be restricted to the user. In case of such and similar events during the service period, the proxy service configuration would be changed and updated and has to be timely uploaded into the ingress proxies 104/106/110, for operating the proxy services to for users according to agreement terms and obligations with the service provider.

Advantages/effects of the agent. This function of service configurations updating and timely uploading to the ingress proxies 106 and 110, is a specific computer-implemented activity which is different from the connection tasks performed by ingress proxies 104/106/110 for multiple users. The connection tasks should be performed efficiently, for a maximum quality of service and uptime without service delays or even downtimes. In the present invention, the ingress proxy servers 104/106/110 implementing the above described embodiments 1, 2 and 3, are freed from the activity of updating and managing service configuration. Instead, this activity is assigned to the agent 114, enabling the proxy services to run efficiently by employing only the ready service configurations in a timely manner.

Purpose of the agent. The agent 114 is devoted to ensure said purpose of managing multiple configurations of proxy services for multiple users, and timely updating those into the up-and-running configurations in ingress proxy nodes 106 and 110.

Although the agent 114 is devoted for serving the proxy service configuration data for methods of embodiments 1, 2, and 3, but it enables to make those Embodiments more efficient by loading-off the service configurations management and dynamic updating from the ingress proxy nodes 106 and 110. As those are essentially occupied with serving multiple proxy connection sessions between many users' devices 102 and many target web services 128.

One essential general function of the agent 114 is to dynamically generate a static configuration for a service/program. Some services/programs don't provide an API or other means to dynamically update some parts or anything at all in a configuration—these parts of the configuration are static. The disclosed agent 114 has a purpose for a proxy service to dynamically generate a static configuration, and apply that configuration to the proxy service (for example, assigned for a particular user). The agent 114 can interact with other systems to fetch needed data and dynamically generate a static configuration, as presented in FIG. 7*a*. As mentioned above, the other systems to be interacted, can be:

- A proxy service user's self-service portal or application;
- Administration panel of proxy services for users;
- A database or archive of earlier known and archived service configurations, etc.

Another important function of the agent 114 is to provide real-time data for a running proxy/service on ingress proxy 104. As presented in FIG. 7*b*, the agent 114 interacts with other external systems (as for example, asset and statistics stores 118, 120 depicted in FIGS. 1, 2, 4) using complex protocols (queue, REST API, stream, . . . ), fetches data, filters and transforms the selected data into a needed form, and then the agent 114 feeds the transformed data to proxy servers/service (ingress proxies 106, 110) in real time, and if needed—also the agent 114 may trigger the proxy service/servers 106, 110 to consume that fed data, or to do some other actions. The agent 114 can also collect important metrics from a proxy/service (ingress proxies 106, 110) and report these collected metrics using the same complex protocols (queue, REST API, stream, . . . ), for example, to store these metrics into the asset store 118 and/or the statistics store 120. Another example of the raw data from external systems may be the proxy service configuration update, initiated by specific formats from the aforementioned user's self-service portal or service administration panel, where the agent 114 transforms those specific formats into a format acceptable by the ingress proxy 104 and updates the running configuration in a timely manner, for example, at the beginning of the next day of the provided service.

The agent 114 may be implemented in a physical or virtual or cloud based server platform together with the ingress proxy servers 106, 110, as a software module, a virtual service, virtual server or in a separate physical server. No limitations for implementing the agent 114 and its communications with other necessary systems shall be imposed behind its essential functions to manage proxy service configurations in a timely manner.

Implementations/Use Cases of Embodiments

The invention embodiments are implemented in real proxy services, comprising the ingress proxy nodes 104/106/110, pluralities of outbound proxy nodes 122/124/126, and using user request command line, to set up temporal or permanent configurations of the proxy service as granted for the user in scope of the managed proxy services.

Implementation in HTTP/HTTPS-based proxy services. An example implementation of 1$^{st}$ and 2$^{nd}$ embodiments or a combination thereof, in a HTTP/HTTPS-based proxy service and infrastructure thereof, comprises at least 2 server nodes with specific software implementations to perform the embodiments (method steps by software algorithms, data configurations, etc.):

1) HTTP Ingress node 104/106, a server running HAProxy, where the functionality of the embodiments 1 and 2 are implemented by employing additional script modules, which perform disclosed functions of the embodiments, also, involving data communications with the agent 114 and external storage databases.
2) One or more HTTP outbound nodes 104/106, each one running SQUID where that SQUID has employed special additional configuration files, enabling to select and manage SQUIDS by the aforementioned HAProxy server, and manage connections by proxy from users' devices 102 to target web services 128.

Implementation SOCKS5-based proxy services. An example implementation of 1$^{st}$ and 2$^{nd}$ embodiments or a combination thereof, in a SOCKS5-based proxy service and infrastructure thereof, comprises at least 2 server nodes with specific their software implementations to perform the embodiments (method steps by software algorithms, data configurations, etc.):

1) SOCKS5 ingress node 104/110, a server running a specific proprietary application VSOCKS, where the functionality of the embodiments 1, 2, and 3, or any combinatorial implementations thereof are deployed according to SOCKS5/RFC 1928 protocol definitions. The proprietary VSOCKS Software modules perform any or all disclosed functions of the embodiments, also, involving data communications with the agent 114 and external storage databases.
2) One or more VSOCKS outbound nodes 104/110, each one running the same proprietary VSOCKS application, which is configured to receive SOCKS5 protocol commands from the ingress node 104/110 VSOCKS, allowed by corresponding firewall configurations.

What is claimed is:

1. A computer-implemented method for requesting a proxy service, by a user's device to a target service, using a proxy service infrastructure comprising a first proxy configured to receive service requests from the user's device, wherein the first proxy is a socket secure version 5 (SOCKS5) ingress proxy server, and further comprising one or more SOCKS5 outbound proxy servers, the method comprising:

a. receiving from the user's device, by the first proxy, a user's request for the proxy service, the user's request comprising a user's identifier required for user authentication by SOCKS5 protocol;
b. authorizing the user's request by the user's identifier, to provide the proxy service to a user;

upon successful authorization of the user's request:

c. receiving from the user's device, by the first proxy, a CONNECT-command from the user's device to the target service;
d. selecting, by the first proxy, an outbound proxy;
e. initiating a first transmission control protocol (TCP)/user datagram protocol (UDP) connection from the first proxy to the selected outbound proxy;
f. initiating a second TCP/UDP connection from the selected outbound proxy to the target service according to the received CONNECT-command;
g. when the first and second TCP/UDP connections are initiated successfully, returning a CONNECT response from the outbound proxy to the first proxy;
h. forwarding the CONNECT response from the first proxy to the user's device; and
i. providing for data communication between the user's device and the target service via the first and second TCP/UDP connections.

2. The computer-implemented method of claim 1, wherein the user's identifier is at least one of:

a username and password, and a white-listed internet protocol (IP) address from which the user makes a request for the proxy service, or combinations thereof.

3. The computer-implemented method of claim 1, wherein the data communication occurs through established SOCKS5 proxy service comprising a proxy communication path sequentially through at least two SOCKS5 proxy nodes of the proxy service infrastructure: the first proxy and at least one outbound proxy.

4. The computer-implemented method of claim 1, wherein the user's request for the proxy service is sent to at least one of:

the first proxy using SOCKS5 protocol at a selected TCP/UDP port number and a hypertext transfer protocol (HTTP)/HTTP secure (HTTPS) ingress proxy, wherein the HTTP/HTTPS ingress proxy forwards the user's request identified as a SOCKS5 protocol request to a SOCKS5 ingress proxy with a same ingress proxy TCP/UDP port number used by the user's request, or combinations thereof.

5. The computer-implemented method of claim 1, wherein the selecting comprises:

selecting, by the first proxy, the outbound proxy, wherein a network identifier of the outbound proxy is selected in a random manner by the first proxy from a configuration list, the configuration list comprising two or more outbound proxy network identifiers.

6. The computer-implemented method of claim 1, wherein the selecting the outbound proxy is selected by the first proxy, according to a TCP/UDP port number at which the first proxy receives the user's request, relating the user's request to a user's service configuration list defining associations between outbound proxies' network identifiers and the first proxy's TCP/UDP port number at which serviceable user requests are received.

7. The computer-implemented method of claim 6, wherein the user's service configuration list comprises one or more service configurations storing internet protocol (IP) addresses of the outbound proxy servers, wherein the outbound proxy servers are data center servers having public IP addresses.

8. The computer-implemented method of claim 1, wherein the user's request comprises a username, the username comprising at least one of:

a country code, a city code, a geolocation, an internet protocol (IP) address of the outbound proxy, a TCP/UDP port number of the first proxy, and any other service quantity and/or quality threshold according to which the proxy service is configured for the user, or combinations thereof.

9. The computer-implemented method of claim 1, wherein the outbound proxy is selected by the first proxy according to a value of at least one proxy-service configuration parameter being identified from a data tag comprised in a "username"-field in the user's request.

10. The computer-implemented method of claim 1, wherein the outbound proxy is selected by the first proxy according to;

a value of at least one proxy-service configuration parameter being identified from a data tag comprised in a "username"-field in the user's request, and a TCP/UDP port number at which the first proxy receives the user's request, relating the user's request to a user's service configuration that defines associations between outbound proxies' network identifiers and the first proxy's TCP/UDP port number at which the user's requests are received.

11. The computer-implemented method of claim 1, further comprising, prior to the receiving (a):

within the first proxy comprising an interconnected hypertext transfer protocol (HTTP)/HTTP secure (HTTPS) ingress node and SOCKS5 ingress node:

a. receiving the user's request from the user's device by the first proxy, and b. if the user's request was received at the HTTP/HTTPS ingress node, resending the received user's request by the HTTP/HTTPS ingress node to the SOCKS5 ingress node.

12. The computer-implemented method of claim 1, wherein the first proxy is a part of the proxy service infrastructure.

* * * * *